US012595904B2

(12) United States Patent
Van Bommel et al.

(10) Patent No.: US 12,595,904 B2
(45) Date of Patent: Apr. 7, 2026

(54) MODULAR TRACK LIGHTING

(71) Applicant: SIGNIFY HOLDING B.V., Eindhoven (NL)

(72) Inventors: Ties Van Bommel, Horst (NL); Peter Deixler, Arlington, MA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/863,678

(22) PCT Filed: May 15, 2023

(86) PCT No.: PCT/EP2023/062962
§ 371 (c)(1),
(2) Date: Nov. 7, 2024

(87) PCT Pub. No.: WO2023/227407
PCT Pub. Date: Nov. 30, 2023

(65) Prior Publication Data

US 2025/0297730 A1 Sep. 25, 2025

Related U.S. Application Data

(60) Provisional application No. 63/345,300, filed on May 24, 2022.

(30) Foreign Application Priority Data

Jun. 7, 2022 (EP) .................................... 22177602

(51) Int. Cl.
*F21V 21/35* (2006.01)
*F21S 2/00* (2016.01)
(Continued)

(52) U.S. Cl.
CPC .............. *F21V 21/35* (2013.01); *F21S 2/005* (2013.01); *F21V 21/005* (2013.01); *F21V 23/06* (2013.01);
(Continued)

(58) Field of Classification Search
CPC ........ F21S 2/005; H05B 45/20; F21V 21/005; F21V 21/35
See application file for complete search history.

(56) References Cited

FOREIGN PATENT DOCUMENTS

| | | |
|---|---|---|
| CN | 204494269 U | 7/2015 |
| DE | 202006019137 U1 | 3/2007 |

(Continued)

OTHER PUBLICATIONS

Innovation Q+ NPL (Year: 2024).*

*Primary Examiner* — Anabel Ton

(57) ABSTRACT

A LED luminaire module is provided, including a track connector, a plurality of LED light sources, and a light exit window. The track connector electrically and mechanically couples the LED luminaire module to a track and is arranged at a center region of the LED luminaire module. The plurality of LED light sources generates LED light. The light exit window exits the LED light generated by the plurality of LEDs from the LED luminaire module as module light. The light exit window is and may be S-shaped, reverse-S-shaped, Z-shaped, or reverse-Z-shaped. The LED luminaire may further include a module connector arranged at an end of the LED luminaire module and mechanically and/or electrically couples the LED luminaire module to a second LED module or a bridge LED luminaire module.

14 Claims, 11 Drawing Sheets

(51) Int. Cl.

| | |
|---|---|
| ***F21V 21/005*** | (2006.01) |
| ***F21V 23/06*** | (2006.01) |
| ***H05B 45/10*** | (2020.01) |
| ***H05B 45/20*** | (2020.01) |
| ***H05B 47/115*** | (2020.01) |
| ***H05B 47/19*** | (2020.01) |
| *F21Y 103/10* | (2016.01) |
| *F21Y 103/20* | (2016.01) |
| *F21Y 115/10* | (2016.01) |

(52) U.S. Cl.
CPC ............. *H05B 45/10* (2020.01); *H05B 45/20* (2020.01); *H05B 47/115* (2020.01); *H05B 47/19* (2020.01); *F21Y 2103/10* (2016.08); *F21Y 2103/20* (2016.08); *F21Y 2115/10* (2016.08)

(56) References Cited

FOREIGN PATENT DOCUMENTS

| | | | | | |
|---|---|---|---|---|---|
| EP | 0955623 | A2 | | 11/1999 | |
| EP | 2722584 | A2 | | 4/2014 | |
| EP | 3678264 | A1 | | 7/2020 | |
| EP | 3719394 | A1 | * | 10/2020 | .............. F21V 21/30 |
| WO | 2016009324 | A1 | | 1/2016 | |
| WO | WO-2021214620 | A1 | * | 10/2021 | ............ F21V 21/096 |

* cited by examiner

MODULAR TRACK LIGHTING

CROSS-REFERENCE TO PRIOR APPLICATIONS

This application is the U.S. National Phase application under 35 U.S.C. § 371 of International Application No. PCT/EP2023/062962, filed on May 15, 2023, which claims the benefit of European Patent Application No. 22177602.4, filed on Jun. 7, 2022. These applications are hereby incorporated by reference herein.

FIELD OF THE DISCLOSURE

The present disclosure is directed generally to modular track lighting.

BACKGROUND

The popularity of track lighting continues to grow. Beyond traditional commercial and/or industrial applications, track lighting has become more popular in residential applications. Generally, track lighting systems include luminaires that are fitted in and electrically connected to a track such that the luminaires can be variably positioned along the track. The track is typically secured to a ceiling of a structure. However, the growing demand for track lighting also comes with demand for track lighting systems with new configurations and new features.

WO 2021/214620 A1 relates a light system comprising a support surface on which one or more luminous bodies can be applied to be electrically powered to emit lighting. One or more of the said luminous bodies which can be electrically supplied to generate a lighting; —An electric assembly to electrically power the said luminous bodies, the said electric assembly comprising one or more electrically conductive tracks. Each one of the luminous bodies is provided with pin assemblies and the support surface comprises one or more receiving holes suitable to receive the pin assemblies of each luminous body. The luminous body can be connected in a removable way to the said support surface with the pins in contact with the track. A magnetic force tends to maintain and/or favor the contact of the pins with the track.

WO 2016/009324 A1 relates to lighting control based on deformation of flexible lighting strip, wherein one or more signals indicative of a shape formed by a flexible lighting strip may be obtained, e.g., from one or more sensors secured to the flexible lighting strip. One or more deformations in the flexible lighting strip may be detected based on the one or more signals. One or more light sources may be selectively energized based on the one or more detected deformations. In some embodiments, one or more light sources contained in a first logical partition of the flexible lighting strip bound by at least one deformation may be energized to emit light having a first property. One or more light sources contained in a second logical partition of the flexible lighting strip separated from the first logical partition by at least one deformation may be energized to emit light having a second property different than the first property.

DE 20 2006 019137 Ul relates to a fastening device for a lighting component, especially for illuminated signs, with at least one clamping adapter for mounting of the lighting component on a support element, has the clamping adapter electrically contactable with the support element by means of a locking element so that the locking element in the locking position is current conducting. The support element and/or the clamping adaptor are formed from electrically conductive material.

SUMMARY OF THE DISCLOSURE

The present disclosure is directed toward light emitting diode (LED) luminaire modules and track lighting systems with a track and one or more LED luminaire modules. The track includes a housing, a positive electrode, and a negative electrode. Each LED luminaire module includes a track connector, a plurality of LED light sources, and a light exit window. The track connector mechanically couples the LED luminaire module to the track. The track connector also electrically couples the LED luminaire module to the positive and negative electrodes of the track. The track connector is arranged approximately at a center region of the LED luminaire module for balance and weight distribution purposes. Light generated by the plurality of the LED light sources exits the module by the light exit window, which, like the module itself, is. Applicant has recognized and appreciated that luminaire modules can be connected together modularly to generate track lighting patterns to provide new lighting configurations and/or features. Applicant has also recognized and appreciated that the spatial direction of the light emitted by each of the LED segments of the LED luminaire modules can vary based on a chosen installation orientation of the track lighting modules.

The LED luminaire modules can be S-shaped, reverse-S-shaped, Z-shaped, or reverse-Z-shaped, or any other linear or nonlinear shape. Further, the LED luminaire modules may mechanically and/or electrically connect to each other via module connectors arranged on their respective ends. The LED luminaire modules may also mechanically and/or electrically connect to bridge LED luminaire modules. The bridge LED luminaire modules lack a track connector, and therefore rely on adjacent LED luminaire modules for electrical power and mechanical support. This modularity allows for customized, meandering luminaire systems to be formed. In embodiments, the LED luminaire modules can form a sinusoidal lighting pattern. In this configuration, the LED luminaire modules can be programmed to generate a continuous light emission pattern that travels from one LED luminaire module to another. This may be facilitated by apportioning the light sources of each LED luminaire module into segments that are controllable via a controller. The controller may then control one or more lighting properties of each individual segment, such as color, intensity, and pattern.

The lighting properties of the light sources of the LED luminaire modules may be further controlled based on orientation data corresponding to the orientation of each module or of each segment of light sources of each module. In one example, a user manually enters the orientation data for each LED luminaire module or each segment via a user interface. In another example, the orientation data may be generated by an orientation sensor embedded in each LED luminaire module. The orientation sensor may generate the orientation data based on the rotational position of the track connector relative to the positive electrode and the negative electrode of the track. The LED luminaire modules may also include additional sensors configured to generate sensor data for the purpose of activity detection. The LED luminaire module may also include a lock to fix the module in place relative to the track.

Generally, in one aspect, a LED luminaire module is provided. The LED luminaire module provides module light. The LED luminaire module includes a track connector. The track connector is configured to electrically couple and mechanically couple the LED luminaire module to a track. The track connector is arranged at a center region of the LED luminaire module.

The LED luminaire module further includes a plurality of LED light sources. The plurality of LED light sources is configured to generate LED light.

The LED luminaire module further includes a light exit window. The light exit window is configured to exit the LED light generated by the plurality of LED light sources as module light.

According to an example, the LED luminaire module is S-shaped, reverse-S-shaped, Z-shaped, or reverse-Z-shaped. Preferably, the light exit window is S-shaped, reverse-S-shaped, Z-shaped, or reverse-Z-shaped.

According to an example, the LED luminaire module further includes a first segment. The first segment includes a first portion of the plurality of LED light sources. The LED luminaire module further includes a second segment. The second segment includes a second portion of the plurality of LED light sources. The second segment is arranged at a first angle relative to the first segment. The LED luminaire module further includes a third segment. The third segment includes a third portion of the plurality of LED light sources. The third segment is parallel to the first segment. The third segment is arranged at a second angle relative to the second segment. Preferably, the second angle is similar to the first angle.

According to an example, the LED luminaire further includes a module connector. The module connector is arranged at an end of the LED luminaire module. Further to this example, the module connector may be configured to mechanically couple and/or electrically couple the LED luminaire module to a second LED luminaire module or a bridge LED luminaire module.

According to an example, the LED luminaire module further includes a module controller. The module controller is configured to adjust one or more lighting properties of the LED light generated by the plurality of LED light sources. The one or more lighting properties are adjusted based on orientation data. The orientation data corresponds to the LED luminaire module. The LED luminaire module may include an orientation sensor configured to generate the orientation data. In some examples, the LED luminaire module may be further configured to adjust the one or more lighting properties based on activity detection data.

According to an example, the LED luminaire module may further include a lock. The lock is configured to fix the LED luminaire module relative to the track.

Generally, in another aspect, a track lighting system is provided. The track lighting system includes a track. The track includes a housing. The track further includes a positive electrode. The track further includes a negative electrode.

The track lighting system further includes a first LED luminaire module. The first LED luminaire module provides module light. The first LED luminaire module includes a track connector. The track connector is configured to electrically couple to the positive electrode and the negative electrode of the track at a center region of the first LED luminaire module. The track connector is further configured to mechanically couple to the housing of the track.

The first LED luminaire module further includes a plurality of LED light sources. The LED light sources are configured to generate LED light.

The first LED luminaire module further includes a light exit window. The light exit window is configured to exit the LED light generated by the plurality of LED light sources.

According to an example, the first LED luminaire module further includes a module connector. The module connector may be arranged at an end of the first LED luminaire module. Further to this example, a second LED luminaire module may be mechanically coupled and/or electrically coupled to the first LED luminaire module via the module connector. In this example, the second LED luminaire module differs from the first LED luminaire module in orientation relative to the track. Even further to this example, the track lighting system may further include a system controller. The system controller may be configured to generate a continuous light emission pattern throughout the first and second LED luminaire modules.

According to an example, a bridge LED luminaire module is mechanically coupled and/or electrically coupled to the first LED luminaire module via the module connector. Further to this example, the bridge LED luminaire module is further mechanically coupled and/or electrically coupled to a second LED luminaire module. The bridge luminaire module is electrically coupled to the first LED luminaire module or the second LED luminaire module.

According to an example, wherein the track lighting system includes N first LED luminaire modules and M second LED luminaire modules. In this example, N plus M is greater than or equal to 5. Further to this example, each of the M second LED luminaire modules includes a light exit window and wherein the N first LED luminaire modules and the M second LED luminaire modules are arranged in a meandering configuration having at least 3 turns. Preferably, the light exit windows of the N first LED luminaire modules and the M second LED luminaire modules are arranged in a meandering configuration having at least 3 turns.

In various implementations, a processor or controller can be associated with one or more storage media (generically referred to herein as "memory," e.g., volatile and non-volatile computer memory such as ROM, RAM, PROM, EPROM, and EEPROM, floppy disks, compact disks, optical disks, magnetic tape, Flash, OTP-ROM, SSD, HDD, etc.). In some implementations, the storage media can be encoded with one or more programs that, when executed on one or more processors and/or controllers, perform at least some of the functions discussed herein. Various storage media can be fixed within a processor or controller or can be transportable, such that the one or more programs stored thereon can be loaded into a processor or controller so as to implement various aspects as discussed herein. The terms "program" or "computer program" are used herein in a generic sense to refer to any type of computer code (e.g., software or microcode) that can be employed to program one or more processors or controllers.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

DETAILED DESCRIPTION OF EMBODIMENTS

The present disclosure is directed to luminaire light emitting diode (LED) modules and track lighting systems with a track and one or more LED luminaire modules. The track includes a housing, a positive electrode, and a negative electrode. Each LED luminaire module includes a track connector, a plurality of LED light sources, and a light exit window. The track connector mechanically couples the LED luminaire module to the track. The track connector also electrically couples the LED luminaire module to the positive and negative electrodes of the track. The track connector is arranged approximately at a center region of the LED luminaire module for balance and weight distribution purposes. LED light generated by the plurality of the light sources exits the module through the light exit window, which, like the module itself, is. Applicant has recognized and appreciated that luminaire modules can be connected together modularly to generate track lighting patterns to provide new lighting configurations and/or features. Applicant has also recognized and appreciated that the spatial direction of the light emitted by each of the segments of the LED luminaire modules can vary based on a chosen installation orientation of the track lighting modules.

Figure 1:
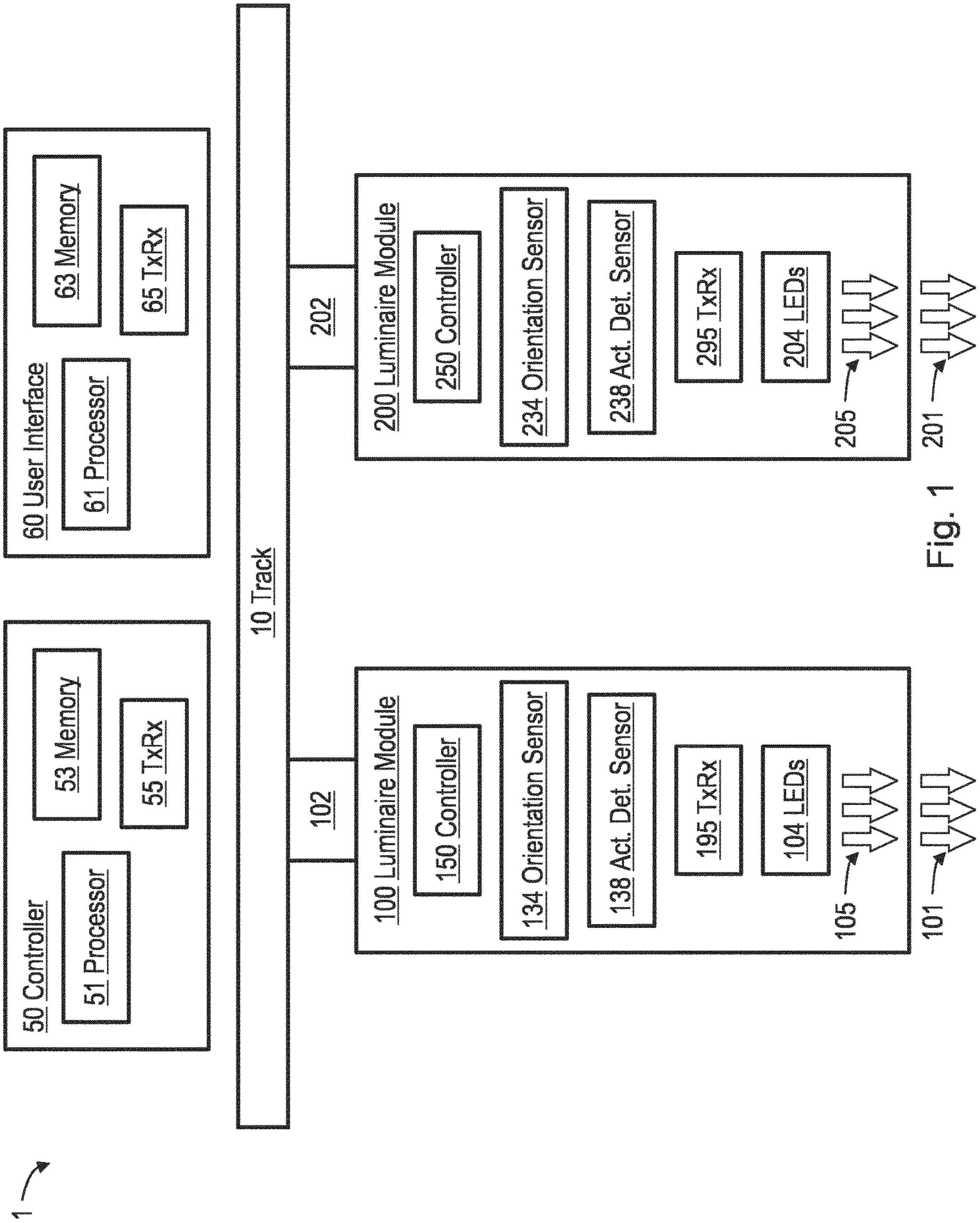
FIG. 1 is a schematic diagram of a track lighting system, according to aspects of the present disclosure.

FIG. 1 illustrates a schematic diagram of a track lighting system 1. Generally, the track lighting system includes at least a track 10 and a first LED luminaire module 100. In some examples, the track lighting system 1 includes a second LED luminaire module 200. As will be demonstrated, any number of LED luminaire modules 100 may be used, depending on the application. In some example, the second LED luminaire module 200 may be (substantially) similar to the first LED luminaire module 100 in terms of size, shape, orientation, or any other characteristic or combination or characteristics.

In this example, the first LED luminaire module 100 includes a track connector 102, a plurality of LED light sources 104, an orientation sensor 134, an activity detection sensor 138, a controller 150, and a transceiver 195. The track connector 102 mechanically and/or electrically couples the first LED luminaire module 100 to the track 10. In one example, the track connector 102 mechanically secures the first LED luminaire module 100 to the housing 12 (see FIG. 2) of the track 10. In another example, the track connector 102 forms an electrical connection with the positive and negative electrodes 14, 16 (see FIG. 2) of the track 10 in addition to the mechanical connection. The track connector 102 may be of any practical connector type or shape.

The LED light sources 104 may be any combination of semiconductor- or diode-based devices capable of generating light 105. In a preferred example, the LED light sources 104 are standard light emitting diodes. In other examples, the LED light sources 104 may be a laser light component, such as a surface mount laser light diode and/or device. In even further examples, the LED light sources 104 may be organic LEDs (OLEDs). Some examples of the flexible body 102 may incorporate a combination of different types of LED light sources 104.

As illustrated in FIG. 1, the LED light 105 is emitted by LED light sources 104. The LED light 105 exits the first LED luminaire module 100 via a light exit window 106 (see FIGS. 3-6) as module light 101. The total of all module light 101 generated by all of the LED luminaire modules 100 of a track lighting system 1 may be referred to as the system light. As will be described below, the plurality of LED light sources 104 may be arranged in a manner. Similarly, the light exit window 106 may also be. In some examples, the light exit window 106 (substantially) follows the overall shape of the LED luminaire module 100. The module light 101, 201 emitted by the first or second LED luminaire modules 100, 200 is preferably white light. The white light may have a correlated color temperature in a range from 2,000 to 6,000 Kelvin. The white light may have a color rendering index of at least 80.

The orientation sensor 134 generates orientation data 132 (see FIG. 10) corresponding to the orientation of the LED luminaire module 100. In one example, the orientation sensor 134 may generate the orientation data 132 by detecting a rotational position of the track connector 102 relative to the positive and/or negative electrodes 14, 16 of the track 10.

Similarly, the activity detection sensor 138 generates activity detection data 140 (see FIG. 10) corresponding to an individual falling in a field of view of the activity detection sensor 138. The activity detection sensor 138 may be configured to detect a wide array of activity. In one example, the activity detection sensor 138 is configured for fall detection or aggression detection. In another example, the activity detection sensor 138 may be configured to determine if an individual is loitering in a retail shop, pushing a shopping cart, or reading.

For example, the activity detection sensor 138 may be a motion sensor, such as an infrared (IR) motion sensor. The fall detection sensor 138 may also generate activity detection data 140 using radio frequency (RF) sensing, time of flight (ToF) sensing, image sensing, thermopile sensing, Wi-Fi Doppler sensing, and/or radar. In embodiments, each segment of light sources can include a sensor component, e.g., one or more antenna structures, for activity detection. The activity sensing may be configured or reconfigured (e.g., selecting which antennas to use for which activity sensing tasks) depending on the detected orientation data 132 of the LED luminaire module 100. For instance, horizontally facing antennas may be used for sensing air quality (e.g., with millimeter wave-based RF sensing), while additional antennas facing towards a floor of a shopping aisle may be used for fall detection.

The first LED luminaire module 100 also includes a controller 150. The controller 150 may include a memory 175 and a processor 185 (see FIG. 10). The controller 150 may be configured to control the light 105 emitted by the plurality of LED light sources 104 by setting one or more lighting properties 130 (see FIG. 10), such as color, intensity, pattern, etc. The lighting properties 130 may be set based on the orientation data 132 and/or the activity detection data 140. For example, orientation data 132 corresponding to a first orientation may cause the controller 150 to illuminate the LED light sources 104 according to a first pattern. If the orientation data 132 is updated to a second orientation (such as due to the orientation sensor 134 detecting the rotation of the LED luminaire module 100), the controller 150 may program the LED light sources 104 to illuminate according to a second pattern. The orientation sensor may determine the orientation of the LED luminaire module 100 in a 2D plane or in 3D. In another example, if the activity detection data 140 indicates a fall, the controller 150 may adjust the lighting properties 130, such as by increasing intensity, changing color, or causing the lights to flash. The term "lighting properties" is intended to refer to the qualities and/or characteristics of the light 105 emitted from the luminaire that describe and/or define the emitted light 105.

In some examples, the lighting properties 130 of the first LED luminaire module 100 may be controlled by an external controller 50. In some examples, the controller 50 is positioned locally to the first LED luminaire module 100, such as in the same room. In other examples, the controller 50 may be located remotely, such as part of a connected lighting system controlling the lighting of an entire building. The external controller 50 may include a processor 51, a memory 53, and a transceiver 55 for enabling wireless communication with the first LED luminaire module 100 via transceiver 195. In one example, the controller 50 may relay a dimming command from the overall connected lighting system. Upon receiving this command, the controller 150 of the first LED luminaire module 100 lowers the intensity of the LED light 105 emitted by the plurality of light sources 104 and/or the module light 101 exiting the light exit window 106.

In some examples, the lighting properties 130 of the first LED luminaire module 100 may be controlled by a user interface 60. In one example, the user interface 60 includes a processor 61, a memory 63, and a transceiver 65 to wirelessly communicate with the controller 50 and/or the first luminaire module 100 directly. In one example, the user interface 60 may be used to receive orientation data 132. This may be particularly useful in arrangements where the orientation sensor 134 is unable to determine the orientation of the first LED luminaire module 100 or in embodiments where the luminaire module omits an orientation sensor 134. The user interface 60 may then wirelessly transmit the orientation data 132 to the first LED luminaire module 100 to update its corresponding lighting properties 130 of light 105.

As further shown in FIG. 1, the track lighting system 1 may also include a second LED luminaire module 200. The second LED luminaire module 200 may be configured in the same manner as the first LED luminaire module 100. The second LED luminaire module 200 may include a track connector 202, a plurality of light sources 204, an orientation sensor 234, an activity detection sensor 238, a controller 250, and a transceiver 295.

Figure 2:
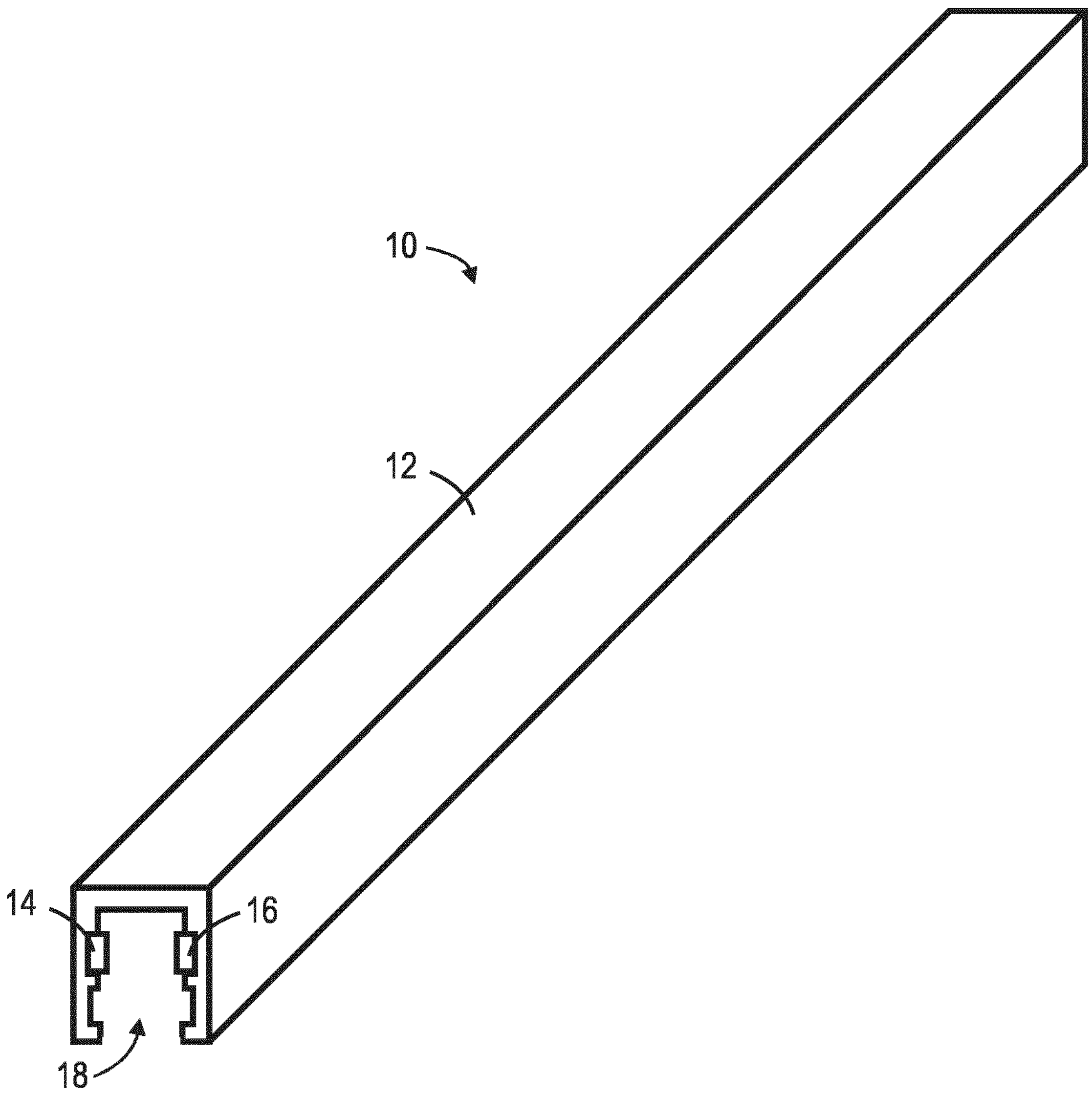
FIG. 2 is an isometric view of a track for a track lighting system, according to aspects of the present disclosure.

FIG. 2 depicts a track 10 of the track lighting system 1 of FIG. 1. Broadly, the track 10 includes a housing 12, a positive electrode 14, and a negative electrode 16. The housing 12 is shaped to receive a track connector 102 (see FIG. 3) in opening 18. The housing 12 may be made of any appropriate material or combination of materials, such as metals and/or plastics. Minimally, the opening 18 mechanically couples the track connector 102 to the track 10, such that the corresponding LED luminaire module 100 may safely hang below the track 10. In further examples, the track connector 102 also electrically couples to the positive and/or negative electrodes 14, 16. If the track connector 102 electrically couples to both the positive and negative electrodes 14, 16, a complete circuit will be formed within the LED luminaire module 100, and electrical power is supplied to the plurality of LED light sources 104 (see FIGS. 3 and 4). In other examples, the LED luminaire module 100 may include a pair of track connectors **102*a*, 102*b* mechanically coupled to the housing 12 of the track 10 (see FIG. 5). In this example, a complete circuit is formed by a first track connector 102*a* electrically coupling to the positive electrode 14 and a second track connector 102*b* electrically coupling to the negative electrode 16**.

Figure 3:
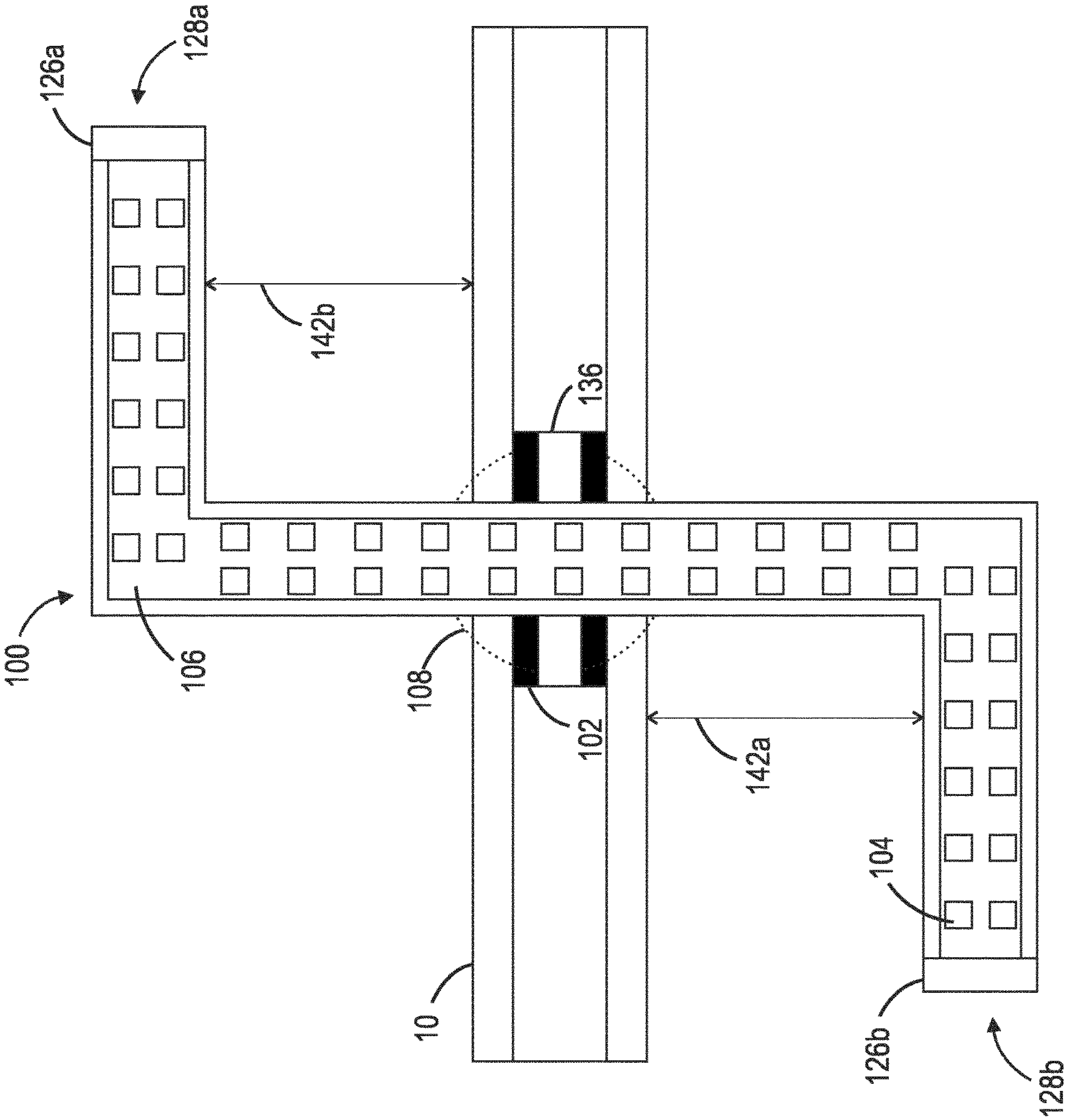
FIG. 3 is a bottom view of a track lighting system with a single LED luminaire module, according to aspects of the present disclosure.

FIG. 3 depicts a bottom view of a LED luminaire module 100 coupled to a track 10. The LED luminaire module 100 includes a track connector 102, a plurality of LED light sources 104, a light exit window 106, and a pair of module connectors **126*a*, 126*b* at ends 128*a*, 128*b*, respectively. As shown, the LED luminaire module 100 is and in the form of an S-shape. Alternatively, the LED luminaire module 100 may be any other shape, such as reverse-S-shaped, Z-shaped, or reverse Z-shaped. While FIG. 3 depicts a LED luminaire module 100 being in a two-dimensional plane, the LED luminaire module 100 may also be in three-dimensional space. For example, the LED luminaire module 100** may incorporate a semi-spiral-like shape.

The plurality of LED light sources 104 in FIG. 3 is arranged in two parallel rows or columns, depending on the orientation of the portion of the LED luminaire module 100 containing the LED light sources 104. However, any other practical amount and/or arrangement of LED light sources 104 may be implemented depending on the application.

Light 105 (see FIG. 1) generated by the LED light sources 104 is emitted by the LED luminaire module 100 as module light 101 through the light exit window 106. As shown in FIG. 3, the light exit window 106 is also and follows the overall shape of the LED luminaire module 100. The light exit window 106 may be made of any clear material, such as plastic or glass or any suitable alternative including a patterned material that includes portions that are transparent or translucent and portions that are less transparent or translucent or opaque. In some examples, the light exit window 106 may be (substantially) S-shaped, reverse-S-shaped, Z-shaped, or reverse-Z-shaped.

As described above, the track connector 102 mechanically and/or electrically couples the LED luminaire module 100 to the track 10. In the example of FIG. 3, the track connector 102 couples to a center region 108 of the S-shaped LED luminaire module 100. By coupling to the center region 108 of the LED luminaire module 100, the track connector 102 provides better stability, balance, and weight distribution than if the track connector 102 was coupled near one of the ends 128*a*, 128*b* of the LED luminaire module 100. The track connector 102 also includes lock 136 configured to fix the LED luminaire module 100 in place relative to the track 10.

The LED luminaire module 100 includes a pair of module connectors 126*a*, 126*b* arranged at the ends 128*a*, 128*b* of the LED luminaire module 100. In the example of FIG. 3, first module connector 126*a* is arranged at first end 126*a*, while second module connector 126*b* is arranged at second end 126*b*. In some examples, the module connectors 126*a*, 126*b* are configured to mechanically couple the LED luminaire module 100 to a second LED luminaire module 200 (see FIG. 6). In further examples, one or both module connectors 126*a*, 126*b* are configured to electrically couple the LED luminaire module 100 to the second LED luminaire module 200. In this way, the electrical power required to illuminate light sources 204 (see FIG. 1) of the second LED luminaire module 200 is provided by the first LED luminaire module 100.

In the example of FIG. 3, the track 10 can be secured to a ceiling of a structure and the LED light sources 104 face downward away from the ceiling such that the module light 101 exiting the light emission window 106 is perpendicular to the ground or the ceiling. In alternative examples, the LED luminaire module 100 (or portions thereof) may be pitched such that the module light 101 approaches the ground at a non-perpendicular angle. Of course, the track 10 can alternatively be secured to a sidewall of a structure instead of a ceiling and the LED light sources 104 can face away from the sidewall such that the module light 101 emitted by the light emission window 106 is perpendicular to the sidewall and parallel to the ceiling and/or ground or floor. The LED luminaire module 100 can also be pitched such that the module light 101 emanates from the sidewall at an angle.

Further in the example of FIG. 3, the LED luminaire module 100 has an amplitude distance 142*a*, 142*b* from the track 10 of at least 30 centimeters or 300 millimeters on either side of the track 10. In an alternative example, the amplitude distance 142 is less than 60 centimeters or 600 millimeters. In the example of FIG. 3, the first amplitude distance 142*a* is (substantially) equal to the second amplitude distance 142*b* for improved stability and balance. However, in other examples, first amplitude distance 142*a* may be (substantially) different from the second amplitude distance 142*b*. The amplitude distances 142*a*, 142*b* of the LED luminaire module 100 may be configured to optimize the stability of the LED luminaire module 100 hanging from the track 10.

Figure 4:
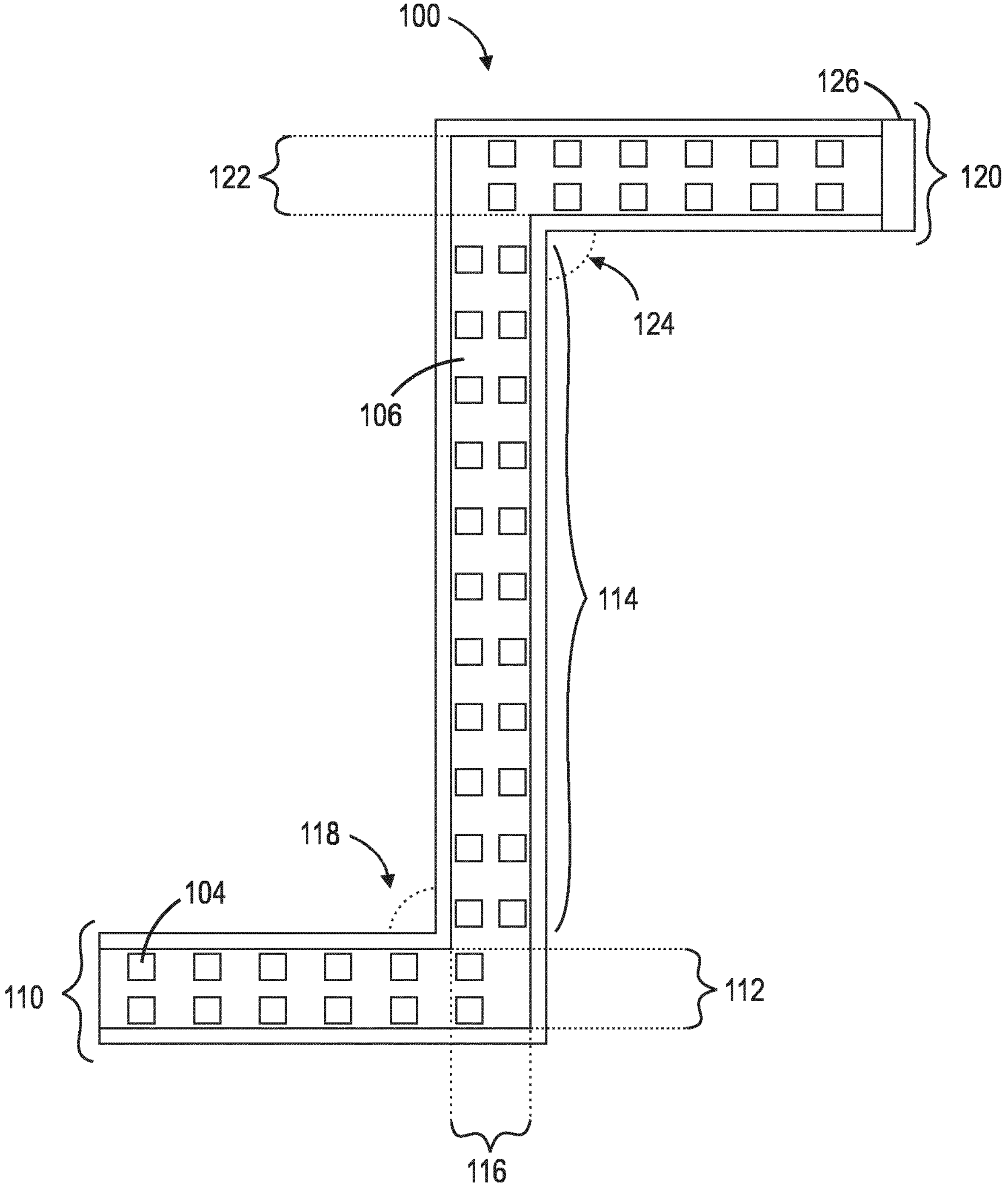
FIG. 4 is a bottom view of a LED luminaire module, according to aspects of the present disclosure.

A further example of a LED luminaire module 100 is shown in FIG. 4. In particular, FIG. 4 shows a LED luminaire module 100 divided into three segments 110, 114, 120. The first segment 110 comprises the lower horizontal portion of the LED luminaire module 100. The second segment 114 comprises the middle vertical portion of the LED luminaire module 100. The second segment 114 is arranged at a first angle 118 relative to the first segment 110. In the example of FIG. 4, the first angle 118 is approximately 90 degrees. Accordingly, in some examples, the second segment 114 may be arranged perpendicularly to track 10 (see FIG. 3), especially if the LED luminaire module 100 is S-shaped or reverse-S-shaped. Further, in some examples, a track connector 102 (see FIG. 3) may be arranged with a region or portion of the second segment 114. The third segment 120 comprises the upper horizontal portion of the LED luminaire module 100. The third segment 120 is arranged approximately parallel to the first segment 110. The third segment 120 is arranged at a second angle 124 relative to the second segment 114. In the example of FIG. 4, the second angle 124 is approximately 90 degrees. Thus, in this preferable example shown in FIG. 4, the first angle 118 is (substantially) similar to the second angle 124. Accordingly, in some examples, the first and third segments 110, 120 may be arranged in parallel to track 10, especially if the LED luminaire module 100 is Z-shaped or reverse-Z-shaped. Other segmentation variations are possible depending on the application.

In further examples, S-shaped, reverse-S-shaped, Z-shaped, and reverse-Z-shaped modules may have first and second angles 118, 124 other than approximately 90 degrees. In some examples, the first and/or second angles 118, 124 of Z-shaped or reverse-Z-shaped modules may be greater than or less than 90 degrees, such as in a range from 30 to 80 degrees or from 100 to 150 degrees. Further, in some examples, the first angle 118 of the module may be greater than or less than the second angle 124.

Each segment 110, 114, 120 contains a corresponding portion of LED light sources 104. The first segment 110 contains first portion 112 of LED light sources 104, the second segment 114 contains second portion 116 of LED light sources 104, and the third segment 120 contains third portion 122 of LED light sources 104. By grouping portions 112, 116, 122 of the LED light sources 104, the LED luminaire module 100 may be configured to illuminate the various portions 112, 116, 122 differently. In one example, the first portion 112 of LED light sources 104 may generate light 105 (see FIG. 1) having a low intensity, the second portion 116 of LED light sources 104 may generate light 105 having a medium intensity, and the third portion 122 of LED light sources 104 may generate light 105 having a high intensity. The low, medium, and high intensity light can be generated simultaneously. Other lighting properties 130 (see FIG. 10) of the LED light sources 104 may vary segment-by-segment. In some examples, the segmentation may be automated by controller 150 (see FIG. 10) according to the overall desired lighting properties 130. For example, if a lighting pattern requires six portions of LED light sources 104, the controller 150 may automatically divide the plurality of LED light sources 104 into six portions.

Figure 5:
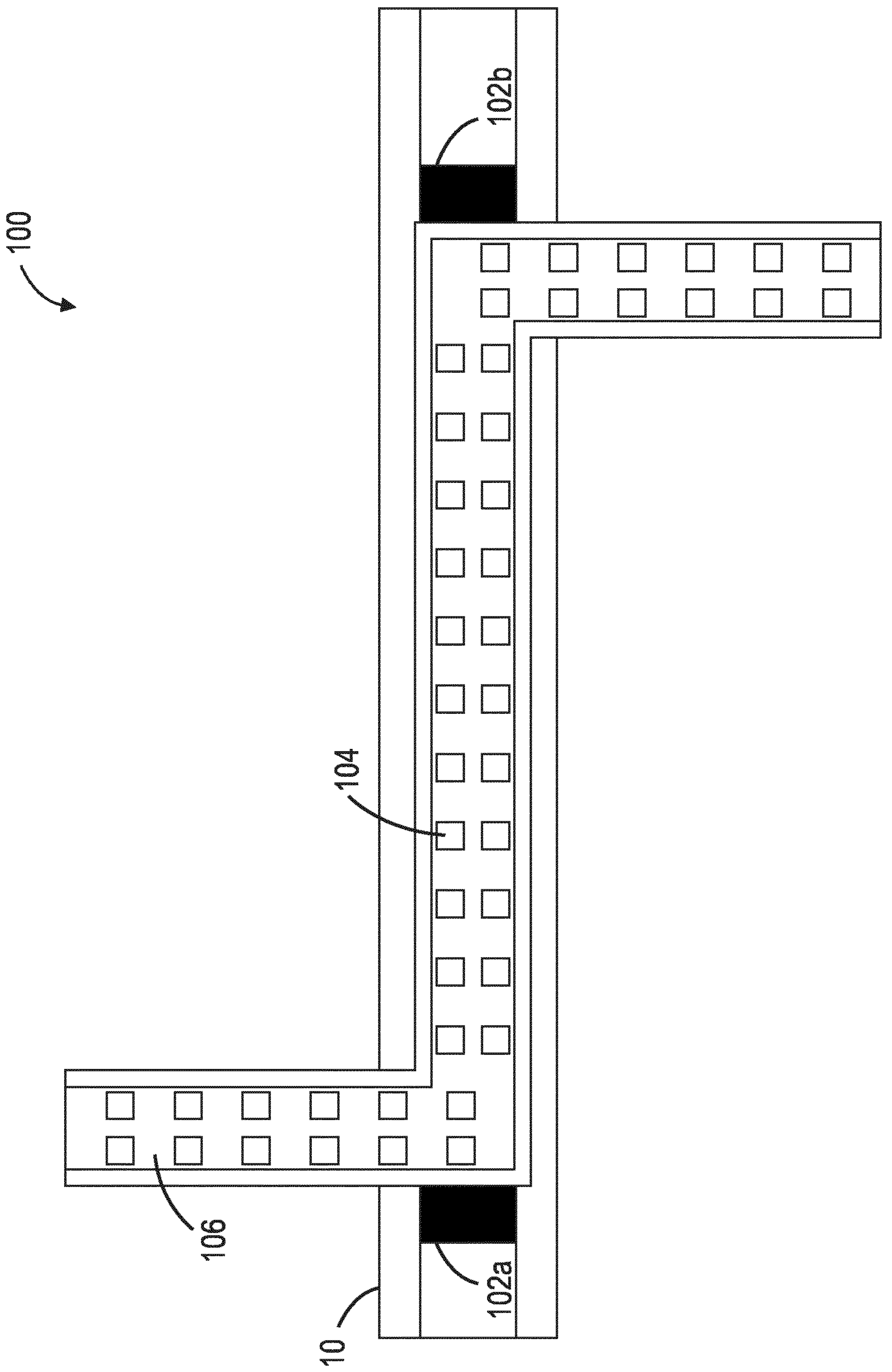
FIG. 5 is a bottom view of a track lighting system with a single LED luminaire module having a pair of track connectors, according to aspects of the present disclosure.

FIG. 5 illustrates a variation of FIGS. 3 and 4 wherein the LED luminaire module 100 includes a pair of track connectors 102*a* and 102*b*. In this example, both track connectors 102*a*, 102*b* are mechanically coupled to the housing 12 (see FIG. 2) of the track 10. Further, either one of, or both of, the track connectors 102*a*, 102*b* electrically couples the LED luminaire module 100 to the positive electrode 14 and/or the negative electrode 16 (see FIG. 2) of the track 10. In one example, one of the track connectors 102*a*, 102*b* is electrically coupled to both of the positive electrode 14 and the negative electrode 16, while the other track connector 102*a*, 102*b* is not electrically coupled to either electrode 14, 16. In an alternative example, one of the track connectors 102*a*, 102*b* is electrically coupled to one of the electrodes 14, 16, while the other track connector 102*a*, 102*b* is electrically coupled to the other electrode 14, 16.

Figure 6:
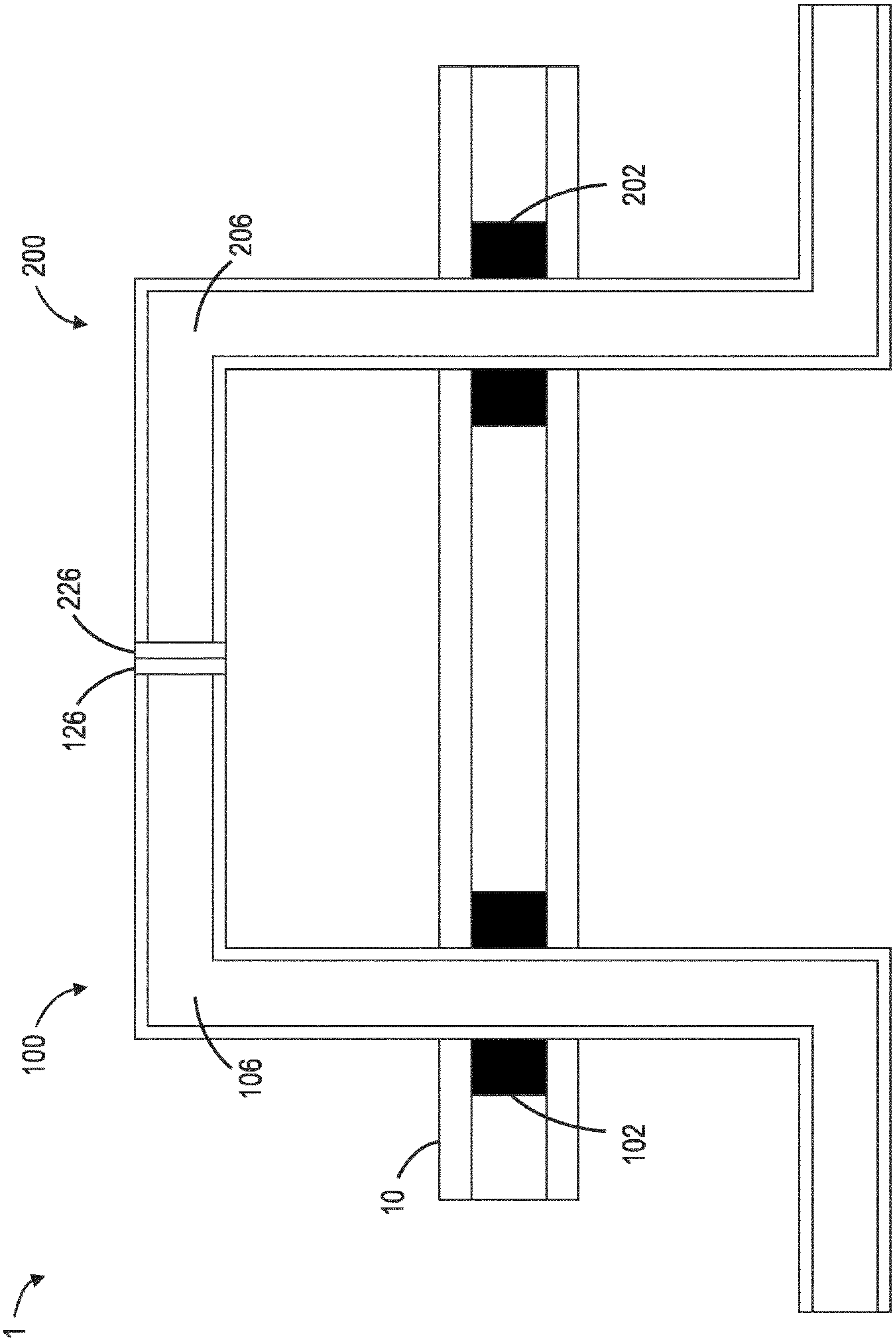
FIG. 6 is a bottom view of a track lighting system with two LED luminaire modules, according to aspects of the present disclosure.

FIG. 6 illustrates a track lighting system 1 having a track 10, a first LED luminaire module 100, and a second LED luminaire module 200. In this example, the first LED luminaire module 100 is mechanically coupled to the track 10 via track connector 102, and the second LED luminaire module 200 is mechanically coupled to the track 10 via track connector 202. Further, the first LED luminaire module 100 includes a module connector 126, while the second LED luminaire module 100 also includes a module connector 226. In one example, the module connectors 126, 226 mate to mechanically connect the first LED luminaire module 100 to the second LED luminaire module 200. In some examples, the module connectors 126, 226 electrically connect the first LED luminaire module 100 to the second LED luminaire module 200. In one example, the track connector 102 mechanically and electrically couples the first LED luminaire module 100 to the track 10, thus providing electrical power to the LED light sources 104 (see FIG. 3) of the first LED luminaire module 100. The track connector 202 mechanically, but not electrically, couples the second LED luminaire module 200 to the track 10. However, the module connectors 126, 226 electrically couple the first LED luminaire module 100 to the second LED luminaire module 200, thus providing electrical power to the light sources 204 (see FIG. 1) of the second LED luminaire module 200. In alternate examples, the second LED luminaire module 200 may provide electrical power to the LED light sources 104 of the first LED luminaire module 100 via the track connector 202 and the module connectors 126, 226.

In some examples, the second LED luminaire module 200 may have some or all of the same features and configurations as the first LED luminaire module 100. For example, the second LED luminaire module 200 may be S-shaped, reverse-S-shaped, Z-shaped, or reversed-Z-shaped, and the light exit window 206 is preferably also S-shaped, reverse-S-shaped, Z-shaped, or reversed-Z-shaped.

More generally, a wide array of combinations of module shapes may be configured to couple to each other. For example, a Z-shaped module may connect to a reverse-Z-shaped module, an S-shaped module may connect to a reverse-S-shaped module, a Z-shaped module may connect to an S-shaped module, and/or a reverse Z-shaped module may connect to a reverse S-shaped module. Other coupling configurations may be possible.

Figure 7:
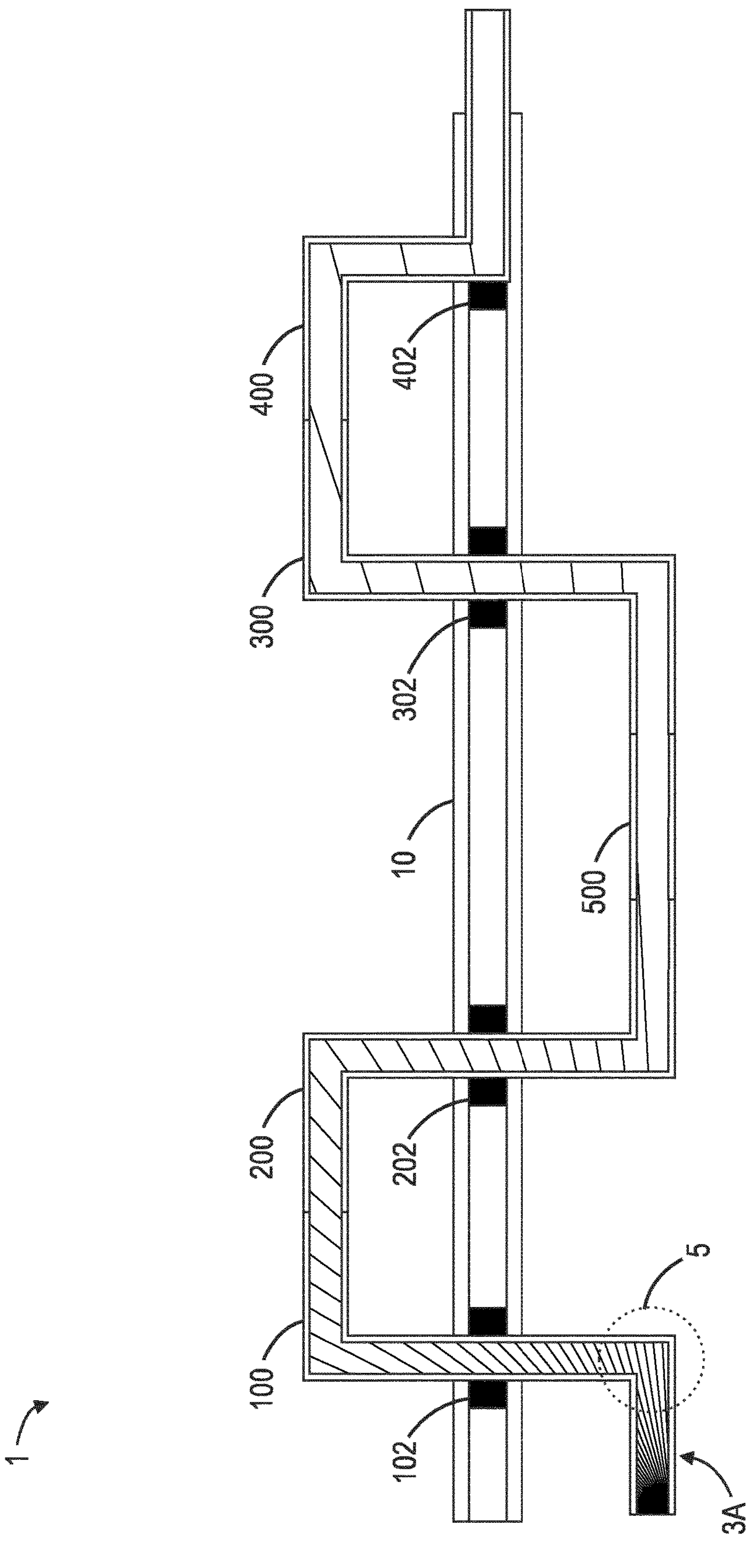
FIG. 7 is a bottom view of a track lighting system generating a continuous light emission pattern, according to aspects of the present disclosure.

FIG. 7 illustrates a track lighting system 1 having a track 10, four LED luminaire modules 100, 200, 300, 400, and a bridge luminaire module 500. While the example of FIG. 7 shows five total luminaire modules 100, 200, 300, 400, 500, the modularity of the luminaire modules allows for any practical number of modules (both and/or bridge) to be used. In this example, a first LED luminaire module 100 may be mechanically and electrically connected to the track 10 via track connector 102. The first LED luminaire module 100 is (substantially) S-shaped. Further, while the overall system of FIG. 7 illustrates eight turns 5, any practical number of turns 5 may be implemented. Further, the amplitude distance 142 (see FIG. 3) and/or pitch may vary between each of the luminaire modules 100, 200, 300, 400, 500 of the system 1.

The second LED luminaire module 200 is (substantially) reverse-S-shaped. The second LED luminaire module 200 may be mechanically and electrically connected to the track 10 via track connector 202. The second LED luminaire module 200 is also mechanically coupled to the first LED luminaire module 100. In some examples, the second LED luminaire module is not electrically coupled to the track 10 via the track connector 202 but is instead electrically coupled to the first LED luminaire module 100.

Like the first LED luminaire module 100, the third LED luminaire module 300 is also (substantially) S-shaped. The third LED luminaire module 300 is mechanically and electrically coupled to the track 10 via track connector 302. The fourth LED luminaire module 400 is also mechanically coupled to the third LED luminaire module 300. The fourth LED luminaire module 400 is (substantially) Z-shaped and may be mechanically and electrically coupled to the track 10 via track connector 402. In some examples, the fourth LED luminaire module 400 is not electrically coupled to the track 10 via the track connector but is instead electrically coupled to the third LED luminaire module 300. Additionally, it should be appreciated that the shape and/or orientation of the LED luminaire modules 100, 200, 300, 400 can vary. For example, both ends of first, second, and third LED luminaire modules 100, 200, 300 can be arranged at first and second distances from the track 10, respectively, and the first and second distances may be the same, e.g., distance 142. While both ends of the first, second, and third LED luminaire modules 100, 200, 300 are at the first and second distances from the track 10, one end of the fourth LED luminaire module 400 can be arranged beneath or underneath the track 10 at a third distance that is less than the first and second distances. Providing one end of the fourth LED luminaire module 400 at the third distance allows different lighting patterns. In embodiments, the length from the end of fourth LED luminaire module 400 beneath the track 10 to the point which is coupled to the track connector 402 has an increased length to provide improved balance. Thus, the portion of the fourth LED luminaire module 400 that is connected to the third LED luminaire module 300 is shorter in length than the portion of the fourth LED luminaire module 400 that extends along track 10 from the track connector 402.

The track lighting system 1 of FIG. 7 also includes a bridge luminaire module 500. Unlike the LED luminaire modules 100, 200, 300, 400, the bridge luminaire module 500 lacks a track connector 102, 202, 302, 402 to mechanically and/or electrically connect to the track 10. Instead, in this example, the bridge luminaire module 500 mechanically couples to the second LED luminaire module 200 and the third LED luminaire module 300. Further, the bridge luminaire module 500 is electrically coupled to the LED luminaire module 200 and/or the third LED luminaire module 300. In this way, the bridge luminaire module 500 is powered by one of (or a combination of) the second and/or third LED luminaire modules 200, 300 without directly coupling to the track 10. The inclusion of bridge luminaire module 500 increases the spacing between the second and third LED luminaire modules 200, 300, effectively "stretching out" the overall sinusoidal shape formed by the modules 100, 200, 300, 400, 500.

As also shown in FIG. 7, luminaire modules 100, 200, 300, 400, 500 may be controlled to provide a continuous light emission pattern 3A throughout the luminaire modules 100, 200, 300, 400, 500. The continuous light emission pattern 3A radiates from the bottom left corner of the first LED luminaire module 100 or a first end of first LED luminaire module 100 and continues throughout the other luminaires 200, 300, 400, 500 of the system 1. The density of the light of continuous light emission pattern 3A is highest at the first end of the first LED luminaire module 100 and lowest at the fourth LED luminaire module 400. The density of the light decreases linearly or otherwise between the first end of the first LED luminaire module 100 and the fourth LED luminaire module 400.

In some example, the track lighting system 1 may be designed according to algorithmic minimums or constraints regarding the total number of LED luminaire modules 100 and turns 5. In one example, the track lighting system 1 may include N first LED luminaire modules 100*n* and M second LED luminaire modules 200*m*. In this example, N plus M is greater than or equal to 5 (N+M≥5), meaning that the track lighting system 1 includes at least 5 LED luminaire modules 100*n*, 200*m*. For example, the track lighting system 1 may have at 4 first LED luminaire modules 100 and 2 second LED luminaire modules 200. Further to this example, the track lighting system 1 may be configured such that the LED luminaire modules 100*n*, 200*m* have a minimum number of total turns 5 to form an overall meandering configuration. For example, the N first LED modules 100*n* may have at least 3 total turns 5 (or, more preferably, 5 turns, or 7 turns, or 10 turns), while the M second LED modules 200*m* may have at least 3 total turns 5 (or more preferably, 5 turns, 7 turns, or 10 turns). Further, in order to form the overall meandering configuration, at least one of the following combinations of module couplings are needed: a Z-shaped module coupled to a reverse Z-shaped module, an S-shaped module coupled to a reverse S-shaped module, or a Z-shaped module coupled to a S-shaped module.

Figure 8:
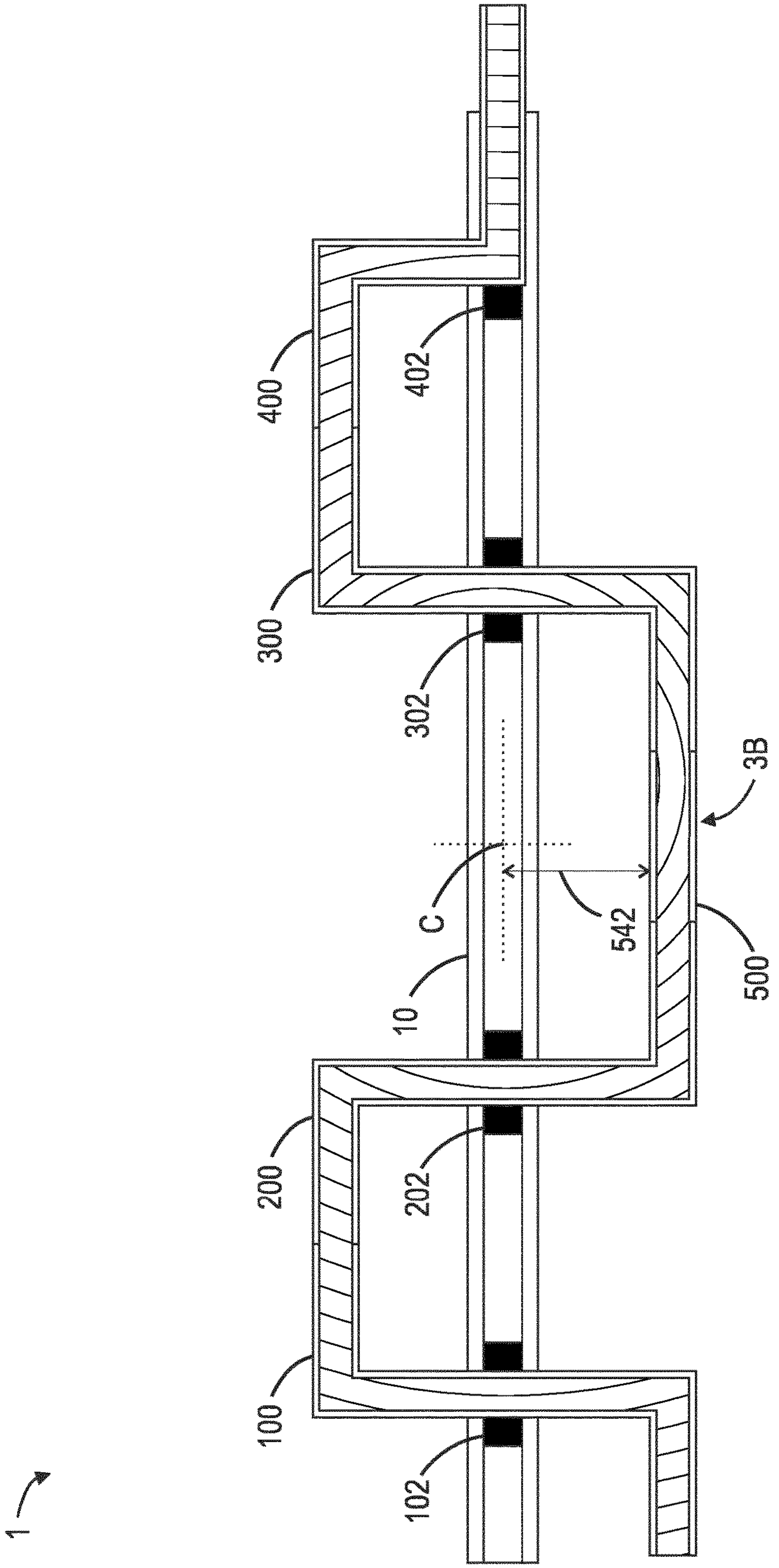
FIG. 8 is a bottom view of a further example of a track lighting system generating a continuous light emission pattern, according to aspects of the present disclosure.

FIG. 8 illustrates a further example of a continuous light emission pattern 3B radiating from a center C of the track lighting system 1 outward throughout the luminaire modules 100, 200, 300, 400, 500. In FIG. 8, due to the configuration of modules 100, 200, 300, 400, 500, the center region of the track lighting system 1 is located within track 10 a distance 542 from bridge luminaire module 500. Since the continuous light emission pattern 3B is circular in the example depicted, arcuate portions of light extend through the various modules.

Figure 9:
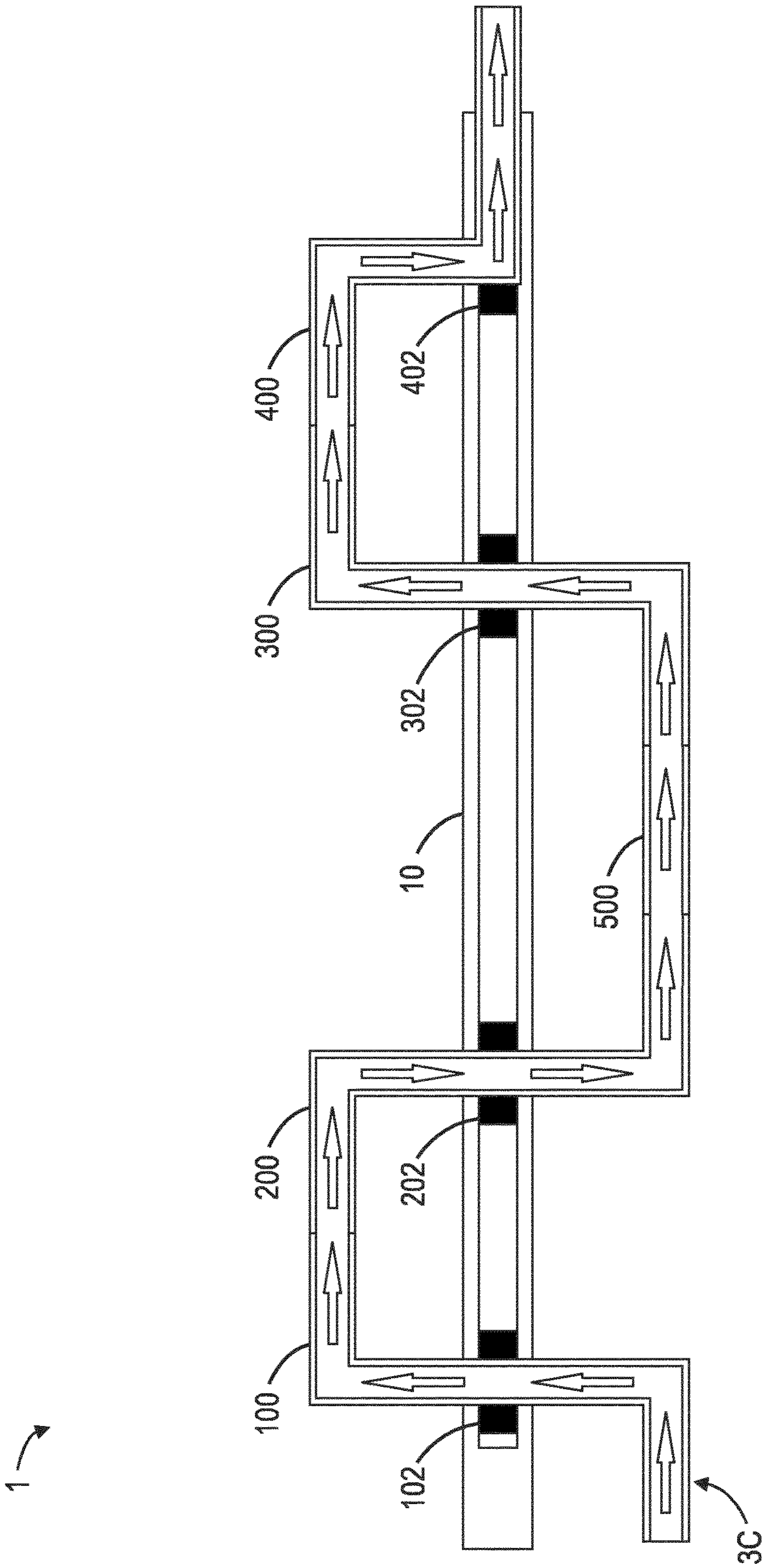
FIG. 9 is a bottom view of an even further example of a track lighting system generating a continuous light emission pattern, according to aspects of the present disclosure.

FIG. 9 illustrates a further example of a continuous light emission pattern 3C (as represented by arrows) meandering throughout the luminaire modules 100, 200, 300, 400, 500 in a left-to-right direction. In some examples, the continuous light emission pattern 3C may implement a color temperature gradient or an intensity gradient throughout the pattern 3C or any other gradient.

Figure 10:
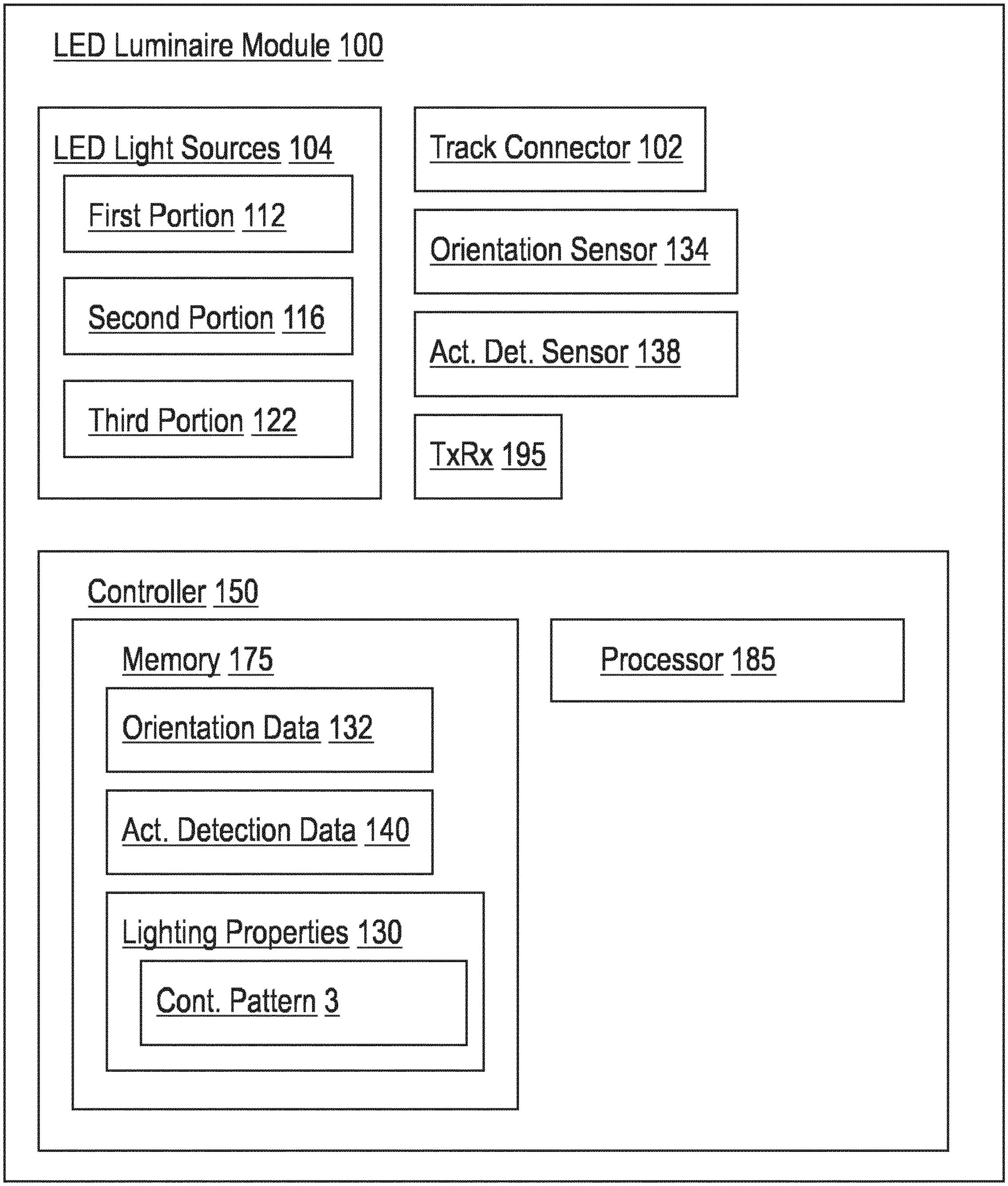
FIG. 10 is a schematic illustration of a LED luminaire module, according to aspects of the present disclosure.

FIG. 10 is a schematic illustration of a LED luminaire module 100. Generally, the LED luminaire module 100 includes a track connector 102, a plurality of LED light sources 104, an orientation sensor 134, an activity detection sensor 138, a controller 150, and a transceiver 195. The LED light sources 104 may be divided into a combination of portions, such as first portion 102, second portion 116, and third portion 122. The controller 150 includes a memory 175 and a processor 185. The memory is configured to store orientation data 132, which may be captured by the orientation sensor 134 or received via the transceiver 195. The memory also stores activity detection data 140, which may be captured by the activity detection sensor 138 or received via the transceiver 195. The orientation data 132 and/or activity detection data 140 received from the transceiver 195 may be transmitted by an external controller 50 (see FIG. 1) and may originate from a user interface 60 (see FIG. 1) or other aspects of a connected lighting system. The processor 185 may control the illumination of the LED light sources 104 according to the lighting properties 130 stored in the memory 175. These lighting properties 130 may be preprogrammed during manufacture or installation. In further examples, the processor 185 may update the lighting properties 130 based on the orientation data 132 and/or the activity detection data 140. For instance, activity detection data 140 indicating a fall may adjust the intensity of the LED light sources 104, or it may cause the LED light sources 104 to strobe in a periodic fashion. In some examples, the lighting properties 130 may define a continuous light emission pattern 3A, 3B, 3C (or a portion thereof) as shown in FIGS. 7-9.

Figure 11:
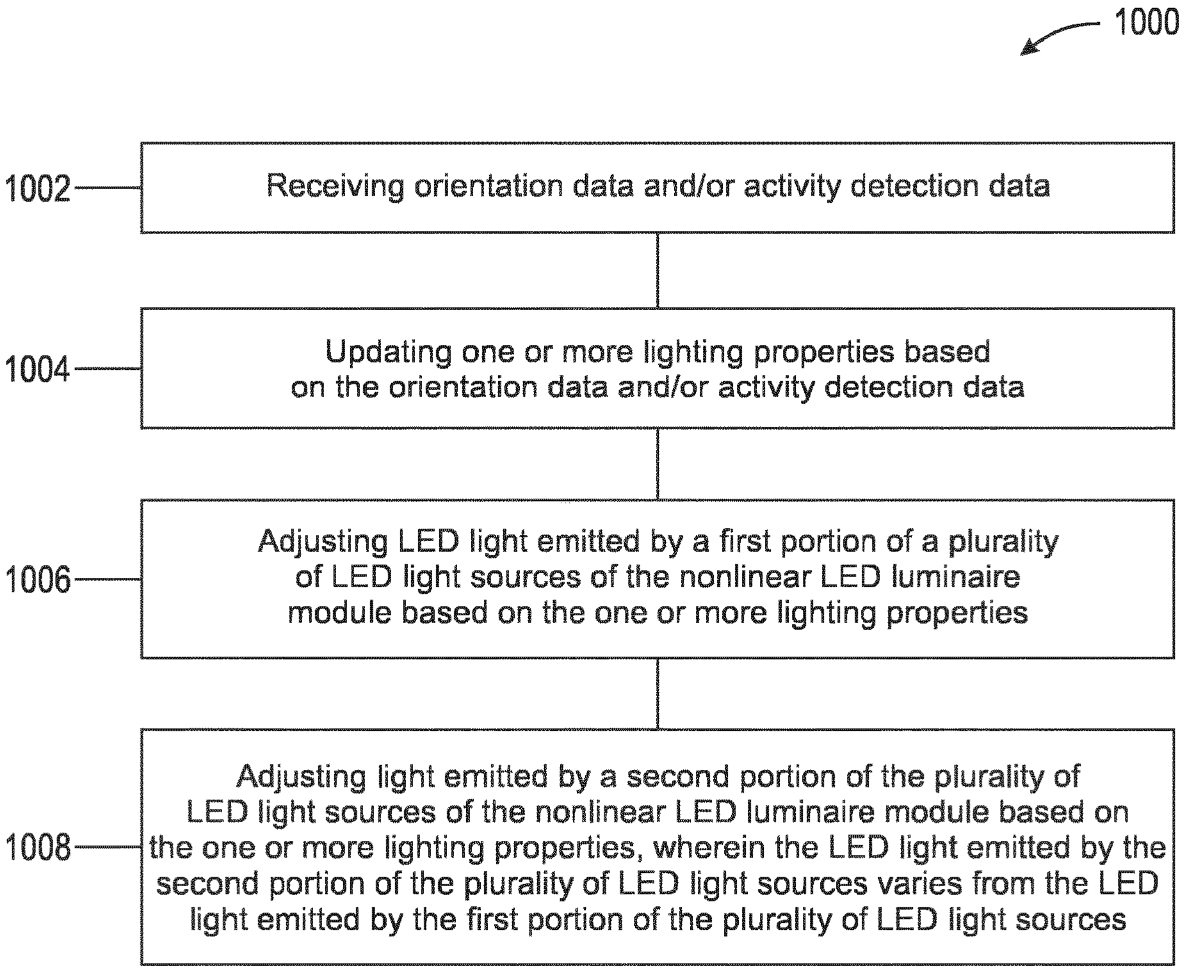
FIG. 11 is a flowchart of a method for controlling light emitting by a LED luminaire module, according to aspects of the present disclosure.

FIG. 11 is a flowchart of a method 1000 for controlling light emitted by a LED luminaire module. The method 1000 includes receiving 1002 orientation data and/or activity detection data. In some examples, the orientation data is captured by an orientation sensor. In other examples, the orientation data is provided via a user interface. Similarly, in some examples, the activity detection data is captured via an activity detection sensor.

The method 1000 further includes updating 1004 one or more lighting properties based on the orientation data and/or activity detection data. The term "lighting properties" is intended to refer to the qualities and/or characteristics of the light emitted from the luminaire that describe and/or define the emitted light. In one example, the lighting properties may be configured to generate a continuous light emission pattern.

The method 1000 further includes adjusting 1006 light emitted by a first portion of a plurality of light sources of the LED luminaire module based on the one or more lighting properties. The method 1000 further includes adjusting 1008 light emitted by a second portion of the plurality of light sources of the LED luminaire module based on the one or more lighting properties, wherein the light emitted by the second portion of the plurality of light sources varies from the light emitted by the first portion of the plurality of light sources. The light emitted by the different portions of light sources may vary in terms of color, intensity, pattern, etc.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The above-described examples of the described subject matter can be implemented in any of numerous ways. For example, some aspects can be implemented using hardware, software, or a combination thereof. When any aspect is implemented at least in part in software, the software code can be executed on any suitable processor or collection of processors, whether provided in a single device or computer or distributed among multiple devices/computers.

The present disclosure can be implemented as a system, a method, and/or a computer program product at any possible technical detail level of integration. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some examples, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions can be provided to a processor of a, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram or blocks.

The computer readable program instructions can also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant can be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, examples can be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The invention claimed is:

1. A light emitting diode, LED, luminaire module providing module light, the LED luminaire module comprising:

a track connector configured to electrically couple and mechanically couple the LED luminaire module to a track, wherein the track connector is arranged at a center region of the LED luminaire module;

a plurality of LED light sources configured to generate LED light;

a light exit window configured to exit the LED light generated by the plurality of LED light sources as the module light, wherein the light exit window is nonlinear or linear, a module connector arranged at an end of the LED luminaire module, wherein the LED luminaire module is non-linear shaped.

2. The LED luminaire module of claim 1, wherein the LED luminaire module is S-shaped, reverse-S-shaped, Z-shaped, or reverse-Z-shaped, wherein the light exit window is S-shaped, reverse-S-shaped, Z-shaped, or reverse-Z-shaped.

3. The LED luminaire module of claim 2, further comprising:

a first segment comprising a first portion of the plurality of LED light sources;

a second segment comprising a second portion of the plurality of LED light sources, wherein the second segment is arranged at a first angle relative to the first segment; and a third segment comprising a third portion of the plurality of LED light sources, wherein the third segment is parallel to the first segment, and wherein the third segment is arranged at a second angle relative to the second segment, preferably wherein the second angle is similar to the first angle.

4. A light emitting diode, LED, luminaire module providing module light, the LED luminaire module comprising:

a track connector configured to electrically couple and mechanically couple the LED luminaire module to a track, wherein the track connector is arranged at a center region of the LED luminaire module;

a plurality of LED light sources configured to generate LED light; and a light exit window configured to exit the LED light generated by the plurality of LED light sources as the module light, wherein the light exit window is nonlinear or linear, a module connector arranged at an end of the LED luminaire module, wherein the module connector is configured to mechanically couple or electrically couple the LED luminaire module to a second LED luminaire module or a bridge LED luminaire module.

5. The LED luminaire module of claim 1, further comprising an orientation sensor configured to generate the orientation data, wherein the module controller is further configured to adjust the one or more lighting properties based on activity detection data; and a module controller configured to adjust one or more lighting properties of the light generated by the plurality of LED light sources based on orientation data corresponding to the LED luminaire module.

6. A light emitting diode, LED, luminaire module providing module light, the LED luminaire module comprising:

a track connector configured to electrically couple and mechanically couple the LED luminaire module to a track, wherein the track connector is arranged at a center region of the LED luminaire module;

a plurality of LED light sources configured to generate LED light; and a light exit window configured to exit the LED light generated by the plurality of LED light sources as the module light, wherein the light exit window is nonlinear or linear, a module connector arranged at an end of the LED luminaire module, and a lock configured to fix the LED luminaire module relative to the track.

7. The LED luminaire module of claim 1, further comprising:

a track lighting system, including:

wherein the track includes a housing, a positive electrode, and a negative electrode; and a first light emitting diode, LED, luminaire module providing module light, the first LED luminaire module comprising:

the track connector configured to:

electrically couple to the positive electrode and the negative electrode of the track at a center region of the first LED luminaire module; and mechanically couple to the housing of the track.

8. The track lighting system of claim 7, wherein the first LED luminaire module further comprises a module connector arranged at an end of the first LED luminaire module.

9. The track lighting system of claim 8, wherein a second LED luminaire module is mechanically coupled or electrically coupled to the first LED luminaire module via the module connector and the second LED luminaire module differs from the first LED luminaire module in orientation relative to the track.

10. The track lighting system of claim 9, further comprising a system controller configured to generate a continuous light emission pattern throughout the first and second LED luminaire modules.

11. The track lighting system of claim 8, wherein a bridge LED luminaire module is mechanically coupled or electrically coupled to the first LED luminaire module via the module connector.

12. The track lighting system of claim 11, wherein the bridge LED luminaire module is further mechanically coupled or electrically coupled to a second LED luminaire module, wherein the bridge LED luminaire module is electrically coupled to the first LED luminaire module or the second LED luminaire module.

13. The track lighting system of claim 7, wherein the track lighting system comprises N first LED luminaire modules and M second LED luminaire modules, wherein N plus M is greater than or equal to 5, wherein each of the M second LED luminaire modules comprises a light exit window, and wherein the N first LED luminaire modules and the M second LED luminaire modules are arranged in a meandering configuration having at least 3 turns, preferably the light exit windows of the N first LED luminaire modules and the M second LED luminaire modules are arranged in a meandering configuration having at least 3 turns.

14. A light emitting diode, LED, luminaire module providing module light, the LED luminaire module comprising:

a track connector configured to electrically couple and mechanically couple the LED luminaire module to a track, wherein the track connector is arranged at a center region of the LED luminaire module;

a plurality of LED light sources configured to generate LED light; and a light exit window configured to exit the LED light generated by the plurality of LED light sources as the module light, wherein the light exit window is nonlinear or linear;

a module connector arranged at an end of the LED luminaire module, wherein the module connector is configured to mechanically couple and electrically couple the LED luminaire module to a second LED luminaire module or a bridge LED luminaire module.

* * * * *